(12) United States Patent
Smith

(10) Patent No.: US 6,451,430 B1
(45) Date of Patent: Sep. 17, 2002

(54) POLYURETHANE, FOAM-POLYESTER COMPOSITE STRUCTURE AND METHOD

(75) Inventor: Stuart B. Smith, Conyers, GA (US)

(73) Assignee: Hehr International Inc., Los Angeles, CA (US)

(*) Notice: Subject to any disclaimer, the term of this patent is extended or adjusted under 35 U.S.C. 154(b) by 0 days.

(21) Appl. No.: 09/227,681

(22) Filed: Jan. 8, 1999

Related U.S. Application Data

(62) Division of application No. 08/943,348, filed on Oct. 3, 1997, now Pat. No. 6,114,402, which is a continuation of application No. 08/636,321, filed on Apr. 23, 1996, now abandoned.

(51) Int. Cl.$^7$ .................. B32B 27/08; B32B 27/00; B32B 27/18; B32B 27/36; B32B 27/40

(52) U.S. Cl. .................. 428/423.7; 156/78; 156/307.1; 156/307.3; 427/373; 427/372.2; 427/393.5; 428/36.5; 428/160; 428/308.4; 428/317.1; 428/317.5; 428/317.7; 428/319.3; 521/137; 521/159; 521/170; 521/172; 521/173; 521/174; 521/176

(58) Field of Search .................. 428/36.5, 160, 428/308.4, 317.1, 317.5, 317.7, 319.3, 423.7; 521/159, 170, 172, 173, 174, 176, 137; 156/78, 307.1, 307.3; 427/373, 372.2, 393.5

(56) References Cited

U.S. PATENT DOCUMENTS

| | | | | |
|---|---|---|---|---|
| 3,765,928 A | * | 10/1973 | Smarook | 427/373 |
| 3,931,450 A | * | 1/1976 | Patton, Jr. et al. | 428/315 |
| 3,966,521 A | * | 6/1976 | Patton, Jr. et al. | 156/78 |
| 4,181,781 A | * | 1/1980 | Chandalia et al. | 521/137 |
| 4,241,131 A | * | 12/1980 | Bailey | 442/374 |
| 4,264,755 A | * | 4/1981 | Cross | 526/322 |
| 4,844,944 A | * | 7/1989 | Graefe et al. | 428/35.7 |
| 5,087,514 A | | 2/1992 | Graefe | 428/315.5 |
| 5,091,436 A | * | 2/1992 | Frisch et al. | 521/137 |
| 5,334,448 A | * | 8/1994 | Horn et al. | 428/319.7 |
| 5,344,852 A | * | 9/1994 | Brooks et al. | 521/99 |
| 5,543,225 A | * | 8/1996 | Mueller et al. | 428/423.1 |
| 6,114,402 A | * | 9/2000 | Smith | 521/117 |

* cited by examiner

*Primary Examiner*—Rabon Sergent
(74) *Attorney, Agent, or Firm*—Leslie Meyer-Leon Esq.; IP Legal Strategies Group P.C.

(57) ABSTRACT

A composite polyurethane foam structure and method of preparing the composite structure, which structure includes a semirigid-rigid polyurethane foam layer having bonded, free, unreacted, ethylenically unsaturated groups like allyl or acrylic groups. The structure includes a cured, unsaturated resin composition layer which is chemically bonded to one or both surfaces of the polyurethane foam layer through the polymerization of the allyl or acrylic group in the foam surface with the polyester resin composition.

23 Claims, No Drawings

# POLYURETHANE, FOAM-POLYESTER COMPOSITE STRUCTURE AND METHOD

This application is a divisional application of U.S. patent application Ser. No. 08/943,348, filed on Oct. 3, 1997, now U.S. Pat. No. 6,114,402, which is a continuation of U.S. patent application Ser. No. 08/636,321, filed on Apr. 23, 1996, now abandoned.

BACKGROUND OF THE INVENTION

Polyester resins are synthetic resins which are polycondensation products prepared by the reaction of dicarboxylic acids with dihydroxy alcohols. Unsaturated polyester resin compositions contain ethylenic unsaturation, usually introduced by unsaturated diols and acids or both, either alone or in combination with saturated diols and acids. Unsaturated polyester resins are cross linked with a compatible monomer, such as a styrene monomer or an acrylic monomer, in amounts ranging from 0% to 50% by weight, thus providing in the presence of a catalyst, like a peroxide, a cured polyester thermosetting resin. Unsaturated polyester resins are prepared typically by maleic and fumaric acids, which may include saturated acids, such as phthalic and adipic acids, and which unsaturated acids may be acid anhydrides. Generally, the dihydroxy alcohols are ethylene, propylene, diethylene and dipropylene glycols. Cross linking agents are typically a styrene monomer and diallyl phthalate.

Unsaturated polyester resin compositions have long been used to prepare composite laminate-type structures. Such laminate structures have often employed a lightweight core material, such as balsa wood, cut or sprayed rigid polyurethane foam and PVC foams, as the core material to produce such composite structures. Generally, an unsaturated resin composition is applied to one or both surfaces of the lightweight core material over a gel coating layer, typically containing pigments to form a top surface of a composite laminate structure. The rigid polyurethane foams employed in such core materials have been cut to dimensions; however, rigid polyurethane foams have also been applied as a spray to the backing layer of an unsaturated polyester resin on the gelcoat layer to form a composite laminate.

Polyurethane products are produced by the condensation reaction of a polyisocyanate, such as a diisocyanate, and a hydroxyl-containing material, such as a polyol, to provide both flexible and rigid polyurethane foam having densities varying from about two to thirty pounds per cubic feet. Rigid polyurethane foams used as core materials are prepared by employing a polyether, such as a polypropylene glycol reacted with a diisocyanate in the presence of water as a blowing agent, and a catalyst (amines, such as a polyethanol polyamine, like diethanol tetramine, and metal salts, such as tin compounds, like dialkyl tin), so that the water reacts with the diisocyanate to cause cross linking and also produce carbon dioxide which produces a polyurethane rigid foam material. Other blowing agents may be employed, such as fluoro hydrocarbons or hydrocarbons and other volatile materials. Generally, rigid polyurethane foams are based on polyethers made from sorbitol, methyl glucoside, sucrose, or combinations thereof. Rigid polyurethane foams are employed for forming lightweight, rigid composite structures, particularly where an unsaturated polyester resin composition is employed as a top or bottom layer with the rigid polyurethane foam material.

The preparation of composite structures using a core material and unsaturated polyester resin layers with core materials, particularly polyurethane rigid foams, share a common problem in that no chemical bond occurs between the core material and the cured unsaturated polyester resin layer composition in contact with the core material creating a structural weakness in the composite laminate product.

It is desirable therefore to provide for a new and improved polyurethane foam composition which may be employed with unsaturated polyester resin compositions, particularly where the polyurethane rigid foam compositions form a core material in a composite, lightweight structural laminate, and wherein an unsaturated polyester resin composition is employed as one or more layers on the core material, and the cured polyester resin layer forms a strong and effective bond with the foam core material.

SUMMARY OF THE INVENTION

The invention concerns a foamable polyurethane composition suitable for use in preparing a core material in a laminate for bonding with an unsaturated polyester resin composition and to the method of preparing a hybrid, structurally rigid polyurethane-unsaturated polyester resin composite structure and the product so prepared.

The invention comprises a foamable polyurethane composition for the preparation of rigid foam polyurethane and adapted for use in bonding to an unsaturated polyester resin composition, typically employed as an unsaturated polyester resin layer in contact with at least one surface of the rigid foam polyurethane composition. The foamable polyurethane composition comprises: a) polyol b) a catalyst, for example, a gelling catalyst and a blowing catalyst, to carry out the polyurethane reaction; c) a blowing agent to provide a rigid polyurethane foam; and d) a polyisocyanate, such as MDI or prepolymer or diisocyanate to react with the polyol with the polyisocyanate generally being in a stoichiometric amount or in a slight excess.

The polyurethane composition also includes or has added thereto an additive organic compound having an active hydroxyl group which reacts with the polyisocyanate and which also contains an available, unreacted ethylenically unsaturated group which reacts subsequently with the monomer-containing unsaturated polyester resin composition applied to the rigid polyurethane foam, thereby providing a strong chemical bond between the rigid polyurethane foam and the cured unsaturated polyester resin composition layer. The additive compound comprises from about 1% to 20% by weight of the polyisocyanate of the polyurethane composition. The ethylenically unsaturated group of the foamable polyurethane composite is available for reaction with the monomer in the unsaturated polyester resin, so that on curing of the unsaturated polyester resin layer, such as by the use of organic peroxide, blown with or without the use of metal salt promoters and accelerators, a strong chemical bond is formed between the rigid polyurethane foam core material, typically as an inner core section of a composite laminate, and the cured unsaturated polyester resin layer.

The additive may be a prepolymer having free isocyanate groups and prepared by reacting said additive organic compound with said active hydroxyl group with separately a polyisocyanate or said polyisocyanate to form a prepolymer, the prepolymer having an unreacted, ethylenically unsaturated group after the reaction with the polyisocyanate to react with a peroxide-curable monomer-containing unsaturated polyester resin composition.

The polyols useful in the polyurethane compositions are selected to provide for a rigid or semirigid polyurethane foam and typically would be a polyol, such as a polyether polyol made from sorbitol, methyl glucoside, or sucrose, a glycerine polyol and hydroxyl amines, and combinations thereof. Aromatic polyesters useful in the polyurethane composition generally comprise saturated aromatic polyesters, for example, prepared by the reaction of phthalic acid, like an dialkyl (i.e. dimethyl) terephthalic acid, with a polyol, such as a polyalkylene glycol, like diethylene or dipropylene glycol, or a terephthalate-ethylene glycol polyester polyol, to provide the aromatic polyester polyol. The polyurethane composition may contain combinations of the polyether polyols and the saturated phthalic-polyol esters. The blowing agent in the polyurethane composition typically and preferred is water; however, other blowing agents, such as fluorocarbon blowing agents, such as chlorocarbon blowing agents, may also be employed, as well as other volatile hydrocarbons. The catalyst employed in the polyurethane composition constitutes a wide variety of catalysts which accelerate the polyurethane reaction including amines, metal carboxylates, particularly tin soaps and organic tin compounds, alone and in combination, used in a catalytic amount, e.g. of 0.01% to 2.0% by weight.

The polyisocyanate generally comprises a diisocyanate, either aliphatic or aromatic, and particularly is MDI or an MDI prepolymer in a stoichiometric amount or in a slight stoichiometric excess, such as up to five percent, relative to the polyether polyol or aromatic polyester. The composition may also include, alone or with the diisocyanates, isocyanate prepolymers, such as a uretonomine polymer and polymeric isocyanates. The diisocyanates used usually have a functionality of greater than two and generally have at least two free isocyanate (NCO) groups ranging from 28% to 33% by weight. In addition, the polyurethane and the polyester compositions may comprise and include various additives, such as polyols or other catalysts, like a gelling catalyst and a blowing agent catalyst, accelerators, flame retardants, but not limited to, such as halo-alkyl phosphates, like polychloro alkyl phosphates, re-enforcing additives, inorganic and fiber fillers, stabilizers, surfactants, such as silicones, and the like, alone or in various combinations. Generally, the polyurethane compositions are divided into an A side and a B side which on mixing, such as at a spray nozzle, are reacted to form a polyurethane foam, with the A side comprising the polyisocyanate, such as the MDI or prepolymer and the organic additive, while the B side comprises the polyol or polyether and the catalyst and various additives. The polyurethane composition may include up to 50% by weight of glass fibers.

The additive organic compound employed may be added to either the A or B side or separately introduced prior to reaction, but generally is added to the A side with the polyisocyanate either reacted with the polyisocyanate in the A side or added as a prior-reacted MDI additive compound. The additive organic compound is selected to have an active hydrogen functionality, such as at least one active hydroxy group, which will enter into a reaction with the polyisocyanate separately or during the polyurethane foam reaction. It also includes one or more ethylenically unsaturated groups (e.g., allyl or acrylic) which do not enter into the urethane reaction, and which are then available for cross linking with the monomer employed in the unsaturated polyester resin composition. Some organic compounds suitable for use in the invention and reaction with the diisocyanate comprise allyl alcohol alkanoates, and more particularly, allyl alcohol ethyoxlate or propoxylated, hydroxy polyester acrylates and polypentaerythritols, e.g. triacrylate and ethyoxylated and propoxylated trimethylol propane poly(tri)acrylates, and combinations thereof.

The organic additive compounds can be added to the B side polyol components of the polyurethane composition, whereby on addition of the B side to the A side, an in situ reaction occurs to form the organic additive compounds.

The polyurethane composition may comprise an A side wherein the polyisocyanate comprises a diisocyanate and includes the additive organic compound or prepolymer, and a B side which comprises the polyether polyol or polyester polyol, the catalyst and the blowing agent; or may comprise an A side wherein the polyisocyanate comprises a diisocyanate and a B side which comprises the polyether polyol or polyester polyol, the catalyst, the blowing agent and the additive organic compound or prepolymer.

The polyester resin compositions employed in the invention are employed to provide one or more cured resin layers in contact with the foam polyurethane either provided in cut form or spray form, and used to form one or more layers of an inner core material of a laminate structure. The polyester resin layer forming a thin, cured, thermosetting layer on one or both sides and generally one side having a gel layer of a cured unsaturated polyester resin composition which contains pigments, such as titanium dioxide, which provides for a hard, cured, white top surface layer. The unsaturated polyester resin composition may contain up to 50% of a monomer, styrene or acrylic monomer, and generally up to about 30% by weight of the styrene monomer, and includes promoter salts therein, so that on the addition of an organic peroxide, the polyester resin cures.

The promoted (containing metal salt) one or more unsaturated polyester resin composition may be sprayed as barrier coats behind and on top of a gelcoat with a very fast cure time with rapid cure to reduce the styrene monomer loss. The employment of a barrier coat, typically with about 5% to 20% of fiberglass sprayed therewith, strengthens the gelcoat, reduces water absorption and lowers water and vapor transmission, particularly where the polyester resin contains an acrylic urethane oligomer therein. Thus, in the preparation of the hybrid foam polyester structural laminates of the invention, a standard, general purpose, promoted unsaturated polyester resin composition may be employed and cured by adding, for example, 0.5% to 2% by weight an organic peroxide, like methyl ethyl ketone peroxide, but usually also employing a cobalt carboxylate, such as cobalt octoate, or other fatty acid cobalt salt.

The hybrid-polyester polyurethane structural foam laminates comprise an inner core structure formed of the rigid polyurethane foam, and which foam contains the unreacted, ethylenically unsaturated groups from the organic additive compound. An unsaturated, promoted polyester resin composition is applied to at least one surface of the rigid polyurethane foam, such as by coating or spraying, and the thickness of which surface may vary, but generally is less than the thickness of the inner core layer, or example, may range from 5 millimeters to 200 millimeters, and more typically, 50 to 150 millimeters. The layer is generally applied with a reinforcing filler additive, either particulate material, or more particularly, glass fibers, ranging from about 0% to 50% by weight, e.g. 5% to 30%, in order to provide strength to the structural foam laminate. The unsaturated polyester resin composition is applied over a thin gelcoat, which gelcoat would form the top or finish surface of the foam laminate and can be comprised of a cured unsaturated polyester resin composition, and usually contains fillers or pigments or combinations, such as metal oxides, like titanium dioxide, to add a white color to the surface of the foam laminate. The gelcoat layer would range from about 5 mils to 50 mils, and more typically, from 20 mils to 35 mils.

The hybrid composite structure typically has a gelcoat layer which ranges from about 1 mil to 20 mils in thickness, the cured polyester layer ranges from about 50 mils to 200 mils in thickness, and the rigid polyurethane foam core layer ranges from about 200 mils to 1000 mils in thickness.

For a composite structural foam laminate employing rigid polyurethane foam as a core material which is used together with a layer of unsaturated polyester resin composition over a gelcoat, it has been found that the cured polyester resin composition layer sprayed on top of the rigid polyurethane foam may be removed with little difficulty and without the sign of any chemical adhesion, and thus constitutes a very weak bond and has no chemical bond between the cured unsaturated polyester resin composition and the basic core material. However, with the employment of an organic additive with and in the formation of the rigid polyurethane foam, the unreacted double bonds allow the unsaturated polyester resins and the monomer therein, in reaction, to react chemically with the unreacted double bonds of the rigid polyurethane foam, thereby creating a strong chemical bond between the cured polyester resin layer and the rigid polyurethane foam layer.

The invention includes the method of preparing a rigid polyurethane foam for use as a core material in a composite structure, which method comprises: preparing a foam polyurethane composition consisting essentially of an A side comprising a polyisocyanate to react with a polyether polyol or aromatic polyester polyol, and a B side consisting essentially of a polyether polyol or aromatic polyester polyol, a catalyst and a blowing agent; adding to the A side or the B side an additive organic compound or a prepolymer prepared by the reaction of the additive organic compound with a polyisocyanate and having free isocyanate groups having an active hydroxyl group to react with the polyisocyanate on the A side, and having after the reaction an available unreacted ethylenically unsaturated group to react with a peroxide-curable, promoted, monomer-containing unsaturated polyester resin composition; and reacting the A and B sides together to form a rigid polyurethane foam. The method includes spraying the A and B sides of the polyurethane foam composition in the presence of glass fibers to form a rigid polyurethane foam-containing glass fibers therein, and wherein the glass fibers comprise about 1% to 50% by weight of the rigid polyurethane foam.

The invention will be described for the purposes of illustration only in connection with certain embodiments; however, it is recognized that those persons skilled in the art may make various modifications, changes, additions and improvements to the illustrated embodiment, all falling within the spirit and scope of the invention.

DESCRIPTION OF THE EMBODIMENTS

A conventional, sprayable, structural polyurethane foam composition was prepared as follows:

Side A 100 parts of MDI (Papi-94 from Dow Chemical Company) a 2.3 functionality 32 NCO % diisocyanate.

| Polyol Side B | | |
|---|---|---|
| Parts by Weight | | |
| 25 | 5,909 | (Quadrol-hydroxy amine) |
| 25 | 74–532 | (Neutral sucrose)[1] |
| 25 | G-600 | (Glycerin polyol)[2] |
| 10 | T.C.P.P. | (Fire retardant-trichloro propyl phosphate) |
| 1 | MR | (Catalyst-gelling-diamine) |
| 0.6 | $H_2O$ | (Blowing agent) |
| 0.1 | D.T. | (Blowing catalyst-diethanol tetramine) |

[1] a propoxylated sucrose pH 7.
[2] a propoxylated glycerin.

EXAMPLE 1

An unsaturated polyester resin gelcoat was sprayed on a plate mold surface at 75° F. in a layer approximately 25 mils thick. After the gelcoat layer was sticky (partially cured), but not wet, a general purpose resin promoted with MEKP unsaturated polyester resin composition was sprayed employing 30% chopped glass on the gelcoat layer at a thickness of about 125 mils, and the polyester resin was allowed to cure and become tack free. The unsaturated polyester resin composition contained a styrene monomer and was subject to cure by the addition of an organic peroxide.

The sides A and B of the polyurethane composition were then mixed and sprayed through a spray nozzle and foamed with about 15% to 20% chopped glass onto the wet polyester resin layer at a thickness of about 500 mils to form a closed cell, rigid polyurethane core material with a foam density of about 10 pcf. When the rigid polyurethane foam layer was tack free, another unsaturated polyester resin composition was then sprayed over the surface of the foam layer at a thickness and under similar conditions as the previous coating layer. The composite sample was then allowed to cure and then removed from the mold. The composite sample then had a cured gel layer (25 mils), a cured polyester resin layer (125 mils), a resin polyurethane foam layer (500 mils) and a cured polyester resin layer (125 mils). Samples were cut therefrom and tested for adhesion between the polyester resin layer and the rigid polyurethane foam layer. The results showed that the cured polyester resin layer could be removed with little difficulty and without any signs of chemical adhesion to the rigid core polyurethane foam layer.

The rigid foam polyurethane may also be formed employing on the B side a saturated aromatic polyester, like Terate 203 (a trademark of Hercules, Inc. of Wilmington, Del.) or 2541 (a trademark of Cape Chemical Co.).

EXAMPLE 2

Example 1 was repeated with the exception that allyl alcohol propoxylate (AAP) was added to the A side MDI polyisocyanate in the amount of five parts, based on the isocyanate. The allyl alcohol propoxylate immediately reacted with the MDI to provide an allyl alcohol propoxylate urethane oligomer. No difference in spraying or foaming in the rigid polyurethane foam was evident after samples were removed from the composite and adhesion tests were run. Unlike Example 1, the rigid polyurethane foam containing the additional organic additive, allyl alcohol propoxylate (AAP), the foam bond between the polyester layers and the rigid polyurethane foam was very strong, and in fact, in order to remove the polyester layer, the foam would have to be destroyed, indicating excellent bond strength. The addition of the organic additive AAP to the polyurethane foam composition did not cause any difficulties. It was noticed that the cell structure, compressive strength and tensile strength remained unchanged. The AAP has a boiling point of 156° C. to 190° C., a hydroxyl number of 370 to 380 and a viscosity of 5 cp. In accordance with the invention, the AAP formed an allyl alcohol propoxylate urethane with the MDI prior to the formation of the rigid foam composition, and thereafter, the allyl group was cross linked with the partially cured unsaturated polyester resin layers to provide a strong chemical bond between the polyester resin layer and the rigid polyurethane foam layer. Substitution of other materials, such as styrene monomer or acrylic monomer on the A side/B side or in the unsaturated polyester resin composition only provides double bonds without active hydroxyl groups, and therefore, the diisocyanate employed does not react and no increase in the bond strength is noted.

A The AAP compound may also be formed as a prepolymer or oligomer by reacting separately with a polyisocyanate such as a TDI/MDI diisocyanate, typically in a stoichiometric amount or in an excess amount of the diisocyanate to provide a prepolymer or oligomer which may then be added to the A or B sides and prior to formation of the rigid polyurethane foam. For example, prepolymers were prepared using allyl alcohol propoxylate with various diisocyanates as follows:

| Papi-94 | 32% NCO | F = 2.4 |
| Papi-27 | 31.5% NCO | F = 2.7 |
| Dow 143-L | 29% NCO | F = 2.1 |

To prepare a allyl alcohol urethane prepolymer, the mixture may be added either to the A side or B side as desired to provide an enhanced chemical bond between the polyester resin and the rigid polyurethane foam composition. The preparation of the prepolymer or oligomer was carried out by heating of the MDI, such as the Papi-94, to 150° F., then 15% of AAP was added and stirred, and after one hour, samples were checked and the percent NCO was determined to be about 21%, the sample still low in viscosity. This prepolymer may have 15% to 20% free NCO.

EXAMPLE 3

The polyurethane composition described in Example 1 was employed and sprayed with the new prepolymer AAP-MDI separately prepared and added in an amount of 5 parts to the A side. As in Example 1, the composite samples were cut and tested for adhesion with the results indicating that once again the adhesion with the addition of the prepolymer provided a strong chemical bond and was excellent.

EXAMPLE 4

Example 3 was repeated employing the oligomer-prepolymer with AAP, but based on the polyisocyanate Dow 143-L and Papi-27. A uretonomine prepolymer and polymeric isocyanate were used to prepare the prepolymer which was employed in a spraying system similar to Example 3. No difference was seen between the preparation and use of the prepolymer and the Papi-94 with respect to adhesion employing the uretonomine prepolymers and polymeric diisocyanates.

EXAMPLE 5

Examples 2, 3 and 4 were repeated using another organic additive, pentaerythritol triacrylate, which contains a pendant reactive hydroxyl group, and in reacting 5 to 10 parts of the pentaerythritol triacrylate with the MDI side A to form a pentaerythritol triacrylate urethane prepolymer. In addition, separate prepolymers were prepared in an amount of about 5 to 10 parts of the pentaerythritol triacrylate to the MDI on the A side and added to the A side both as separate prepolymers and a direct addition to the A side. The results obtained are the same as with the use of allyl alcohol propoxylate-urethane and its prepolymer. The pentaerythritol triacrylate is a commercial product, Sartomer (SR 444), a product of Sartomer Company of Exton, Pennsylvania.

EXAMPLE 6

Examples 2, 3 and 4 were repeated both using as the organic additive compound the hydroxy polyester acrylate (TONE Monomer M-100, a product of Union Carbide Chemicals and Plastics Company Inc.). The organic additive was added to the A side and as an in situ prepared oligomer and as a prepolymer. The Tone M-100 comprises a hydroxy polyester acrylate (approximately 90%), up to 10% hydroxyethyl acrylate, up to 1% E-caprolactone and up to 1% ethylene glycol-diacrylate. The hydroxy polyester acrylate was prepared by the polymerization of a caprolactone with an acrylic compound. The results were the same or similar to the employment of the other organic additives and the prepolymers prepared therefrom in that the bond between the cured polyester layers and the rigid polyurethane foam layer was excellent.

Thus, foamable polyurethane compositions may be prepared for the preparation of rigid foam polyurethane for use in preparing products with polyester resin layers. The polyurethane composition contains an organic additive or additive-oligomer having a hydroxyl group and at least one ethylenic unsaturated group, for example, a hydroxy-containing acrylate monomer. The use of the organic additive containing hydroxyl group and ethylenic unsaturated groups, typically an acrylic group, and more particularly, a hydroxy-containing acrylate or allyl-type monomer, can be added to a diisocyanate to prepare a urethane prepolymer or oligomer or isocyanate prepolymers or uretonomine prepolymers, and then either the organic additive or the prepolymer or oligomer then prepared is added to the polyurethane prior to the preparation or forming of the rigid urethane foam composition.

The invention is directed to unique prepolymers or oligomers, and to new and improved polyurethane compositions adapted to provide foam products and for use with unsaturated polyester resin compositions to provide a strong chemical bond and to the hybrid polyurethane clad-type urethane foam structures wherein a polyurethane foam, particularly a rigid polyurethane foam, forms a core material with a cured layer or an unsaturated polyester resin composition to form a cured resin layer on one or both surfaces of the core material to form a strong, structural laminate. The partially cured unsaturated polyester resin composition can be chemically bonded by its monomer in the presence of a peroxide to the unreacted ethylenic unsaturated groups of the structural foam polyurethane to create hybrid structural foam composite products.

The invention has been described more particularly in connection with the employment of foamable urethane compositions employed to prepare a rigid foam urethane composite structure. However, it is recognized that the employment of the organic additives to the urethane compositions and the use of such urethane composition in connection with and bonded to a polyester resin composition may also be used with a wide variety of foam and non-foam, flexible and rigid, thermoplastic and thermosetting polyurethane compositions in order to effect a bond between the polyurethane composition and an unsaturated polyester resin composition and curing of the unsaturated polyester resin composition.

What is claimed is:

1. A method of preparing a composite foam structure of a rigid polyurethane foam core material and a bonded layer of cured polyester resin composition, which method comprises:
   a) providing a rigid polyurethane foam material, prepared by the reaction of a foamable composition which comprises: a polyisocyanate; a polyol; a catalyst; a blowing agent; and an organic additive, which organic additive is selected from the group consisting of:
      i) an additive monomer having one or more hydroxyl groups; and
      ii) an additive prepolymer prepared by the reaction of the hydroxyl groups of the additive monomer with a stoichiometric amount or excess amount of a polyisocyanate; the additive monomer and additive prepolymer having ethylenically unsaturated groups which remain unreacted in the foamable composition and resulting prepared rigid foam, the ethylenically unsaturated groups selected from the group consisting of: allyl groups; acrylic groups; and combinations thereof;
   b) applying a layer of an unsaturated polyester resin composition which comprises an ethylenically unsaturated polyester resin, a monomer, and a curing agent to one or both surfaces of the foam material; and
   c) curing the polyester resin composition, to bond chemically the contacting surfaces of the polyester resin layer and the rigid foam material, by the polymerization reaction of the ethylenically unsaturated groups of the foam material with the polyester resin layer.

2. The method of claim 1 wherein the ethylenically unsaturated groups are selected from the group consisting of: allyl alcohol alkanoates; hydroxyl polyester acrylates; pentaerythritol polyacrylates; and combinations thereof.

3. The method of claim 1 which includes forming a sprayed glass fiber-containing layer of said polyurethane foam material.

4. The method of claim 1 which includes applying to one surface of the polyurethane foam core material, a layer of a curable unsaturated polyester resin composition which comprises a promoter; styrene; and a peroxide as a curing agent to cure the polyester resin composition in contact with the polyurethane foam surface to provide a chemical polymerization adhesive bond between the surfaces of the cured polyester resin composition and the polyurethane foam material.

5. The method of claim 1 which includes spraying the unsaturated polyester composition, in the presence of glass fibers, to form a cured polyester resin coating layer on one or both surfaces of the foam material.

6. The composite foam structure prepared by the method of claim 1.

7. The method of claim 1 wherein the monomer comprises a styrene or acrylic monomer.

8. The method of claim 1 wherein the curing agent comprises an organic peroxide.

9. The method of claim 1 wherein the ethylenically unsaturated polyester resin comprises the reaction product of a dicarboxylic acid and a dihydroxy alcohol.

10. The method of claim 1 where the polyisocyanate comprises a diisocyanate, and the polyol is selected from the group consisting of: a polyether polyol; an aromatic polyester polyol; and combinations thereof.

11. The method of claim 1 which includes a hydroxyl amine.

12. The method of claim 1 wherein the composition comprises about 1 to 20 percent by weight of the organic additive.

13. The method of claim 1 of wherein the polyisocyanate comprises methylene di-p-phenylene isocyanate (MDI), or a methylene di-p-phenylene isocyanate (MDI) prepolymer prepared by the reaction of methylene di-p-phenylene isocyanate (MDI) with the polyol in a stoichiometric amount or excess.

14. The method of claim 1 wherein the organic additive is prepared by the reaction of a diisocyanate and a polyol selected from the group consisting of: allyl alcohol propoxylate; a hydroxy polyester acrylate; a pentaerythritol triacrylate; and combinations thereof.

15. The method of claim 1 which includes:
   a) applying a gelcoat of an unsaturated, polyester resin composition onto a mold surface, to form a gelcoat polyester resin layer;
   b) applying a first layer of an unsaturated, polyester resin composition onto the gelcoat layer;
   c) applying a foamable polyurethane composition onto the first layer, to form the polyurethane foam material as a polyurethane foam material core layer;
   d) applying a second, unsaturated polyester resin composition onto the polyurethane foam material core layer; and
   e) curing the first and second polyester resin composition and gelcoat layers in the mold, to form a polyester-polyurethane foam core sandwich composite structure, wherein the polyurethane foam layer is chemically bonded at the surfaces of the foam core material to the first and second polyester resin composition layers.

16. The composite foam structure prepared by the method of claim 15.

17. The method of claim 15 which includes applying all layers, by spraying, and wherein the first and second polyester resin layers and the polyurethane foam layer contain glass fibers.

18. A polyester rigid polyurethane foam composite structure which comprises:
   a) a rigid polyurethane foam core layer containing unreacted, ethylenically unsaturated groups chemically bonded to the polyurethane foam selected from the group consisting of: allyl groups; acrylic groups; and combinations thereof, wherein the polyurethane foam is prepared with an organic additive, which organic additive is selected from the group consisting of:
      i) an additive monomer having one or more hydroxyl groups; and
      ii) an additive prepolymer prepared by the reaction of the hydroxyl groups of the additive monomer with a stoichiometric amount or excess amount of a polyisocyanate; the additive monomer and additive prepolymer having ethylenically unsaturated groups which remain unreacted in the foamable composition and resulting prepared rigid foam, the ethylenically unsaturated groups selected from the group consisting of: allyl groups; acrylic groups; and combinations thereof;
   b) a cured unsaturated polyester resin composition layer on at least one surface of the polyurethane foam core layer; and
   c) the surfaces of the cured polyester resin layer and the polyurethane foam core layer chemically bonded to each other by reaction on the surface of the ethylenically unsaturated groups to the cured polyester resin composition layer.

19. The structure of claim 18 which includes a cured surface gelcoat layer which contains a pigment.

20. The structure of claim 19 wherein the gelcoat layer ranges from about 1 mil to 20 mils in thickness, the cured polyester resin layer ranges from about 50 mils to 200 mils in thickness, and the polyurethane foam core layer ranges from about 200 mils to 1000 mils in thickness.

21. The structure of claim 18 wherein the cured polyester resin layer, the polyurethane foam layer, or both layers, contain glass fibers.

22. The structure of claim 18 which includes a surface gelcoat layer, a peroxide-cured polyester resin layer, a polyurethane foam core layer, and a peroxide-cured polyester resin layer.

23. The structure of claim 18 wherein the polyester resin layer is derived from a polyester resin composition which comprises polyester resin prepared by the reaction product of a dicarboxylic acid and a dihydroxy alcohol, an acrylic or styrene monomer, and an organic, peroxide-curing agent.

* * * * *